United States Patent
Handa (10) Patent No.: US 8,725,377 B2
(45) Date of Patent: May 13, 2014

(54) CONTROL DEVICE FOR CONTROLLING DRIVE FORCE THAT OPERATES ON VEHICLE

(75) Inventor: Toshiyuki Handa, East Liberty, OH (US)

(73) Assignee: Nissin Kogyo Co., Ltd., Nagano (JP)

( * ) Notice: Subject to any disclaimer, the term of this patent is extended or adjusted under 35 U.S.C. 154(b) by 287 days.

(21) Appl. No.: 13/075,910

(22) Filed: Mar. 30, 2011

(65) Prior Publication Data

US 2012/0253622 A1    Oct. 4, 2012

(51) Int. Cl.
   *G06F 7/70* (2006.01)

(52) U.S. Cl.
   USPC .......................................................... 701/70

(58) Field of Classification Search
   None
   See application file for complete search history.

(56) References Cited

U.S. PATENT DOCUMENTS

| | | | |
|---|---|---|---|
| 4,964,047 A * | 10/1990 | Matsuda | 701/74 |
| 4,974,163 A * | 11/1990 | Yasuno et al. | 701/74 |
| 5,132,907 A * | 7/1992 | Ishikawa | 701/74 |
| 5,608,631 A * | 3/1997 | Tsutsumi et al. | 701/74 |
| 6,374,171 B2 * | 4/2002 | Weiberle et al. | 701/71 |
| 2006/0212173 A1 | 9/2006 | Post, II | |
| 2008/0306687 A1 * | 12/2008 | Ryu et al. | 701/213 |

* cited by examiner

*Primary Examiner* — Thomas Tarcza
*Assistant Examiner* — Garrett Evans
(74) *Attorney, Agent, or Firm* — Rankin, Hill & Clark LLP (57) ABSTRACT

A drive force-limiting device for limiting a drive force that acts on a drive wheel of a vehicle includes an acceleration correction unit for correcting a first acceleration of the vehicle and obtaining a corrected second acceleration, a first calculation unit for calculating a first speed of the vehicle on the basis of a wheel speed of the drive wheel and the first acceleration, a second calculation unit for calculating a second speed of the vehicle on the basis of the wheel speed and the second acceleration, a request unit for requesting a limiting drive force for limiting the drive force in a case that a difference between the first speed and the second speed is equal to or greater than a first threshold value, and an estimation unit in which the second speed is used as an estimated speed of the vehicle. The request unit requests the limiting drive force, whereby, when the wheel speed is less than a second threshold value, the estimation unit resets the second speed using the first speed and obtains the estimated speed.

11 Claims, 8 Drawing Sheets

CONTROL DEVICE FOR CONTROLLING DRIVE FORCE THAT OPERATES ON VEHICLE

FIELD OF THE INVENTION

The present invention relates to a control device for controlling front wheel drive force and rear wheel drive force of a vehicle, and more particularly to a control device (drive force-limiting device) for limiting drive force of a vehicle.

BACKGROUND OF THE INVENTION

Vehicles, e.g., automobiles, generally have four wheels; i.e., two front wheels and two rear wheels, and can have an electronic control device for driving the wheels.

Japanese Laid-open Patent Application (JP-A) No. 2006-256605 discloses a four-wheel-drive electronic control unit (4WD-ECU) as such an electronic control device. The 4WD-ECU disclosed in Japanese Laid-Open Patent Application No. 2006-256605 together with a vehicle stability assist (VSA)-ECU controls the drive force that acts on the vehicle; and, specifically, sets the four-wheel-drive force in terms of units of, e.g., torque.

The VSA-ECU disclosed in JP 2006-256605 A sends to the 4WD-ECU a request, e.g., a torque-limiting request value for limiting each of the four wheel drive forces. The 4WD-ECU can reduce wheel torque (each of the four wheel drive forces) in accordance with such a torque-limiting request value. The VSA-ECU can thus limit the drive force that acts on a drive wheel of a vehicle.

A VSA-ECU or other vehicle behavior control means can generally be provided with at least one function from among a function for suppressing spinning of wheels (traction control system), a function for suppressing locking of wheels (antilock brake system), and a function for suppressing side-slipping of a vehicle.

Japanese Laid-open Patent Application (JP-A) No. 02-306865 discloses a vehicular false speed generating device (estimated speed generation device) used as control means including, e.g., a function for suppressing wheel spinning, a function for suppressing wheel locking, and other functions.

The vehicular false speed generating device disclosed in the lower right column of page 3 of JP 02-306865 A is provided with an adder 20e for calculating a center-of-mass acceleration correction value Gc which offsets the center-of-mass acceleration G by an amount equal to an offset value (e.g., 0.3 G).

Thus, in the case that the offset value is added to the vehicle acceleration (e.g., center-of-mass acceleration G) to obtain a corrected acceleration (e.g., center-of-mass acceleration correction value Gc), the corrected acceleration becomes greater than the acceleration prior to correction. Therefore, the present inventor recognized that the estimated speed may be calculated to be greater than the true speed in the case that the estimated speed of the vehicle is calculated on the basis of the corrected acceleration.

SUMMARY OF THE INVENTION

An object of the present invention is to provide a drive force-limiting device that can improve the precision of estimated speed.

Other objects of the present invention will be apparent to those skilled in the art in the description of a plurality of modes and preferred embodiments below with reference to that attached diagrams.

A number of aspects from among the plurality of aspects pursuant to the present invention will be described below in order to facilitate understanding of the general overview of the present invention.

According to a first aspect of the present invention, there is provided a drive force-limiting device for limiting a drive force that acts on a drive wheel of a vehicle, comprising: an acceleration correction unit for correcting a first acceleration of the vehicle and obtaining a corrected first acceleration as a second acceleration; a first calculation unit for calculating a first speed of the vehicle on the basis of a wheel speed of the drive wheel and the first acceleration; a second calculation unit for calculating a second speed of the vehicle on the basis of the wheel speed and the second acceleration; a request unit for requesting a limiting drive force for limiting the drive force in a case that a difference between the first speed and the second speed is equal to or greater than a first threshold value; and an estimation unit in which the second speed is used as an estimated speed of the vehicle, wherein the request unit requests the limiting drive force, whereby, when the wheel speed is less than a second threshold value, the estimation unit resets the second speed using the first speed and obtains the estimated speed.

The request unit requests a limiting drive force for limiting the drive force in the case that the difference between the first speed and the second speed is at a first threshold value or greater. In other words, in the case that the difference between the first speed and the second speed is at a first threshold value or greater, the request unit can request a limit of the drive force under the assumption that a drive wheel is slipping. In accordance with such a request, it is possible that the drive wheel is slipping when the wheel speed is less than the second threshold value. Therefore, it is assumed that the second speed (estimated speed) is being calculated to be greater than the true speed, and the estimation unit resets the second speed by using the first speed. The second speed (estimated speed) is thereby brought closer to the true speed and the precision of the estimated speed is improved.

Preferably, the estimation unit uses, as the estimated speed, a value obtained by subtracting, from the second speed calculated by the second calculation unit, the difference between the second speed and the first speed when the wheel speed is less than the second threshold value.

The estimation unit reduces the second speed (estimated speed) to a first speed when the wheel speed is less than a second threshold, whereby the precision of the estimated speed is improved.

According to the invention, the limiting drive force may be a drive force that does not affect the first acceleration.

Since the limiting drive force is set to a drive force that does not affect the first acceleration, the vehicle can continue to accelerate.

Alternatively, limiting drive force may be a drive force that can keep the first acceleration in a state in which the drive wheel does not slip.

The limiting drive force is set to a drive force that allows the first acceleration to be maintained so that the drive wheel does not actually slip. The vehicle can be restrained from accelerating with unnecessarily high energy by preparing such a drive force in advance.

Preferably, the estimation unit continues to use the second speed as the estimated speed in a case that the wheel speed is not less than the second threshold, even when a predetermined time has elapsed from the time at which the request unit requested the limiting drive force.

It is possible that the drive wheel is not slipping when the wheel speed is less than the second threshold value. Therefore, the estimation unit can continue to use the second speed as the estimated speed without resetting the second speed by using the first speed.

In one preferred form of the present invention, the request unit sends the limiting drive force to a drive force control device for controlling a front wheel drive force and a rear wheel drive force of the vehicle; the drive wheel is an auxiliary drive wheel; the drive force is an auxiliary drive wheel drive force that acts on the auxiliary drive wheel; the limiting drive force limits the drive force of the auxiliary drive wheel; and the auxiliary drive wheel drive force is one of the drive force of the front wheel or the drive force of the rear wheel.

In the case that the vehicle is caused to accelerate by front wheel drive force and rear wheel drive force, the request unit of the drive force-limiting device can request a limiting drive force (limitation of the drive force of the auxiliary drive wheel) to the drive force control device. In accordance therewith, the drive force control device reduces the drive force of the auxiliary drive wheel, and the estimation unit of the drive force-limiting device verifies whether an auxiliary drive wheel is slipping and is capable of resetting the second speed by using the first speed as required.

According to the invention, the request unit may send the limiting drive force to a motor control device for controlling a motor of the vehicle; and the limiting drive force may limit motor drive force.

In the case that the vehicle is caused to accelerate by front wheel drive force and rear wheel drive force, the request unit of the drive force-limiting device can request a limiting drive force (limitation of the motor drive force) to the motor control device. In accordance therewith, the motor control device reduces the motor drive force. The front wheel drive force and the rear wheel drive force are reduced by the reduction in the motor drive force, and the estimation unit of the drive force-limiting device verifies whether a drive wheel (e.g., a rear wheel) is slipping and is capable of resetting the second speed by using the first speed as required.

According to the invention, the second threshold value may be based on at least one of the first speed and the second speed.

The second threshold value can be determined in accordance with at least one of the first speed, which depends on the true speed of the vehicle, and the second speed. Thus, since the second threshold value is more suitably determined, the drive force-limiting device can more suitably verify whether a drive wheel is slipping.

According to the invention, the second threshold value is based on a ratio with respect to the difference between the first speed and the second speed.

The second threshold value can be set at a high level on the basis of a proportion of the difference between the first speed and the second speed when the first speed and the second speed increase. In the case the second threshold value is variable, the estimation unit can reset the second speed by using the first speed with more suitable timing.

According to a second aspect of the present invention, there is provided a control device comprising: the drive force-limiting device described above; and a drive force control device for controlling the drive force, wherein the request unit sends the limiting drive force to the drive force control device.

The request unit of the drive force-limiting device can request a limitation of drive force from the drive force control device. When the wheel speed is less than the second threshold, the control device (estimation unit of the drive force-limiting device) can reset the second speed by using the first speed. The second speed (estimated speed) is thereby brought closer to the true speed and the precision of the estimated speed is improved.

According to a third aspect of the present invention, there is provided a vehicle behavior control device provided with the drive force-limiting device described above.

The vehicle behavior control device (request unit of the drive force-limiting device) can request a limitation of drive force. The vehicle behavior control device (estimation unit of the drive force-limiting device) can reduce the speed of the vehicle and obtain the estimated speed with a timing in which the wheel speed is less than a second threshold value. The estimated speed is thereby brought closer to the true speed and the precision of the estimated speed is improved.

Persons skilled in the art can readily understand that each of a plurality of embodiments in accordance with the present invention can be modified without departing from the spirit of the present invention.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

The embodiments described below are used for facilitating understanding of the present invention. Therefore, persons skilled in the art should note that that the present invention is not unduly limited by the embodiments described below.

1. Vehicle

Figure 1:
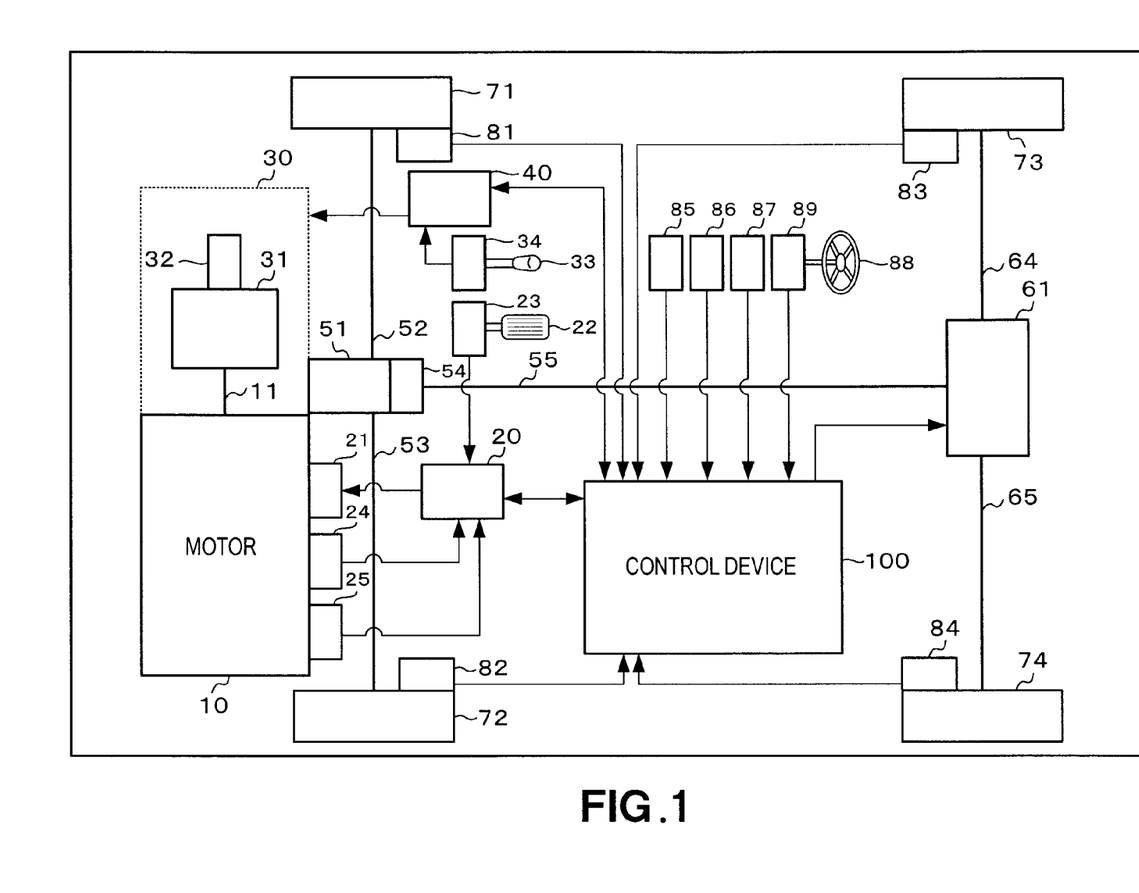
FIG. 1 is a diagrammatical view showing a general configuration of a vehicle provided with a control device according to the present invention.

FIG. 1 diagrammatically shows a general configuration of a vehicle provided with a control device according to the present invention. A vehicle 1 (e.g., an automobile) is provided with a control device 100 capable of executing various controls, as shown in FIG. 1. The control device 100 is capable of controlling the front wheel drive force (the target value of the drive force transmitted to front wheels 71, 72) and the rear wheel drive force (the target value of the drive force transmitted to rear wheels 73, 74) of the vehicle 1 as examples of the various controls. Specific control of the control device 100 according to the present invention is described below in "2. Control Device."

In the example of FIG. 1, the vehicle 1 is provided with a motor 10 (e.g., gasoline engine or another internal combustion engine), the motor 10 has an output shaft 11, and the motor 10 can cause the output shaft 11 to rotate. The vehicle 1 is provided with motor control means 20 (also referred to as motor control device, e.g., an engine ECU) for controlling the motor 10, and a throttle actuator 21. The motor control means 20 obtains the motor drive force (target value), and the motor control means 20 controls the throttle actuator 21 so that the rotation (the actual motor drive force) of the output shaft of the motor 10 matches the motor drive force (target value).

The throttle (not shown) position for controlling the amount of air-fuel mixture flowing into the motor 10 is controlled based on the motor drive force via the throttle actuator 21. In other words, the motor control means 20 obtains the throttle position that corresponds to the motor drive force, generates a control signal that corresponds to the throttle position, and sends the control signal to the throttle actuator 21. The throttle actuator 21 adjusts the throttle position in accordance with the control signal from the motor control means 20.

The vehicle 1 is provided with an accelerator pedal 22 and an accelerator sensor 23. The accelerator sensor 23 detects the amount of operation of the accelerator pedal 22 by the driver of the vehicle 1 and sends the amount of operation of the accelerator pedal 22 to the motor control means 20. The motor control means 20 generally obtains the throttle position or the motor drive force on the basis of the amount of operation of the accelerator pedal 22. The vehicle 1 is provided with an engine speed sensor 24 and a pressure sensor 25. In the case that the motor 10 is, e.g., an engine, the engine speed sensor 24 can detect the engine speed, and the pressure sensor 25 can detect the absolute pressure inside the intake tube that takes the air-fuel mixture into the engine. The motor control means 20 can obtain the throttle position or the motor drive force on the basis of the amount of operation of the accelerator pedal 22, and the detected absolute pressure and engine speed. The motor control means 20 can modify the amount of operation of the accelerator pedal 22 on the basis of a control signal (e.g., the traveling state of the vehicle 1) from the control device 100. Alternatively, the motor control means 20 may obtain the motor drive force and the throttle position on the basis of the amount of operation of the accelerator pedal 22, the detected engine speed, the detected absolute pressure, and a control signal from the control device 100.

In the example of FIG. 1, the vehicle 1 may be provided with a power transmission apparatus (power train, drive train). The power transmission apparatus has, e.g., a transmission 30, a front differential gear mechanism 51, front drive shafts 52, 53, a transfer 54, a propeller shaft 55, a rear differential gear mechanism 61, rear drive shafts 64, 65, as shown in FIG. 1. The transmission 30 has a torque converter 31 and gear mechanism 32.

The power transmission apparatus is not limited to the example of FIG. 1, and it is also possible to modify, revise, or implement the example of FIG. 1. The power transmission apparatus may be, e.g., the drive force transmission system 3 disclosed in FIG. 2 of Japanese Laid-open Patent Application (JP-A) No. 07-186758.

The rotation (the actual motor drive force) of the output shaft of the motor 10 is converted to actual all-wheel drive force (the actual front-wheel drive force and the rear-wheel drive force) via the power transmission apparatus. In the control related to such conversion, the all-wheel drive force is determined based on the motor drive force (target value) of the motor control means 20, the amplification factor (target value) of the torque converter 31, and the speed-change gear ratio (target value) of the gear mechanism 32. The distribution from the front-wheel drive force (target value), which is the main drive wheel drive force, to the rear-wheel drive force (target value), which is the auxiliary drive wheel drive force, is determined based on the front-wheel drive force (target value) and the distribution ratio of the rear differential gear mechanism 61.

In the case that the distribution ratio of the rear differential gear mechanism 61 is, e.g., 100:0 in terms of the front-wheel drive force to rear-wheel drive force, the front-wheel drive force (target value), which is the main drive wheel drive force, matches the all-wheel drive force (target value). In the case that the distribution ratio of the rear differential gear mechanism 61 is, e.g., (100−x):x in terms of the front-wheel drive force to rear-wheel drive force, the front-wheel drive force (target value), which is the main drive wheel drive force, matches the value obtained by subtracting the rear-wheel drive force (target value), which is the auxiliary drive wheel drive force, from the all-wheel drive force (target value).

The front wheels 71, 72 are controlled by the front-wheel drive force (target value) via the front differential gear mechanism 51 and the front drive shafts 52, 53. The rear wheels 73, 74 are controlled by the rear-wheel drive force (target value) via the rear differential gear mechanism 61 and the rear drive shafts 64, 65. The actual all-wheel drive force is transmitted to the propeller shaft 55 via the transfer 54, and a portion of the actual all-wheel drive force transmitted to the propeller shaft 55 is distributed to the actual rear-wheel drive force transmitted to the rear differential gear mechanism 61. The remaining portion of the actual all-wheel drive force transmitted to the propeller shaft 55, transfer 54, and front differential gear mechanism 51 is the actual front-wheel drive force.

In the example of FIG. 1, the vehicle 1 is provided with transmission control means 40 (e.g., an automatic transmission (AT) ECU) for controlling the speed-change ratio (e.g., the speed-change gear ratio of the gear mechanism 32) of the transmission 30. The vehicle 1 is provided with a shift lever 33 and a shift position sensor 34, and the transmission control means 40 generally determines the speed-change gear ratio of the gear mechanism 32 on the basis of the shift position (e.g., "1," "2," "D") of the shift lever 33 as detected by the shift position sensor 34.

In the case that the shift position of the shift lever 33 is, e.g., "1," the transmission control means 40 controls the gear mechanism 32 so that the gear mechanism 32 has a speed-change gear ratio that represents the first speed. In the case that the shift position of the shift lever 33 is, e.g., "D," the transmission control means 40 determines the speed-change gear ratio that represents any one among all of the speed-change gears constituting the gear mechanism 32 composed of, e.g., first speed to fifth speed, on the basis of a control signal (e.g., the speed of the vehicle 1 and the all-wheel drive force (target value)) from the control device 100. In accordance therewith, the transmission control means 40 controls the gear mechanism 32 so that the gear mechanism 32 has a speed-change gear ratio that represents any one of, e.g., the first to fifth speeds. For example, when the transmission control means 40 thereafter changes from, e.g., the speed-change gear ratio that represents the first speed to the speed-change gear ratio that represents the second speed, the transmission control means 40 controls the gear mechanism 32 so that the gear mechanism 32 changes from the speed-change gear ratio that represents the first speed to the speed-change gear ratio that represents the second speed.

In the example of FIG. 1, the vehicle 1 is provided with a wheel speed sensor 81 for detecting the rotational speed of the front wheel 71, and is also provided with a wheel speed sensor 82 for detecting the rotational speed of the front wheel 72. The vehicle 1 is provided with a wheel speed sensor 83 for detecting the rotational speed of the rear wheel 73, and is also provided with a wheel speed sensor 84 for detecting the rotational speed of the rear wheel 74. The control device 100 can obtain the speed of the vehicle 1 on the basis of the rotational speed (wheel speed) detected by the wheel speed sensors 81, 82, 83, 84. The vehicle 1 is provided with a longitudinal acceleration sensor 85 (e.g., longitudinal G sensor for detecting acceleration in units of gravitational acceleration) for detecting the acceleration of the vehicle 1 along the or longitudinal direction of the vehicle 1, and the control device 100 can correct the speed of the vehicle 1 using the acceleration.

In the example of FIG. 1, the vehicle 1 is provided with a yaw rate sensor 86 for detecting the yaw rate when the vehicle 1 turns. The vehicle 1 is also provided with a lateral acceleration sensor 87 (lateral G sensor for detecting the centrifugal acceleration in units of gravitational acceleration) for detecting the centrifugal force (centrifugal acceleration) of the vehicle 1 along the lateral direction of the vehicle 1. The vehicle 1 is provided with a steering wheel 88 and a steering angle sensor 89, and the steering angle sensor 89 detects the steering angle of the steering wheel 88.

The control device 100 can detect side slipping and other behavior of the vehicle 1 on the basis of the yaw rate, centrifugal acceleration (lateral acceleration), and steering angle. In addition to detecting such behavior, the control device 100 can carry out various controls (e.g., control related to at least one among the front wheels 71, 72 and the rear wheels 73, 74 via the brakes or other braking unit (not shown)), and all of the controls described above are not required to be carried out. Described below is a general overview of control of the control device 100.

2. Control Device

Figure 2:
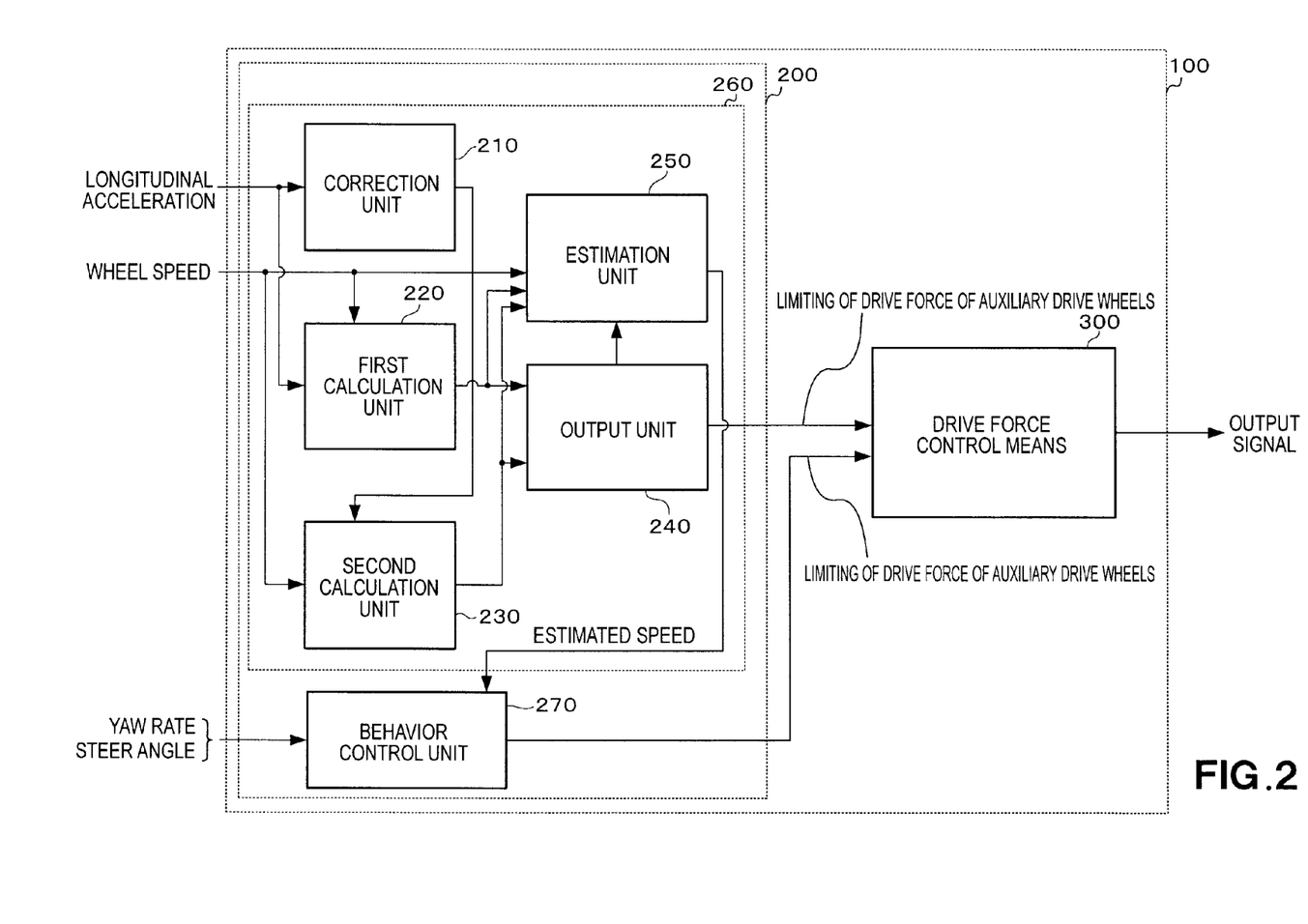
FIG. 2 is a block diagram of the control device including a drive force-limiting unit (drive force-limiting device) and a vehicle behavior control means (vehicle behavior control device) according to the present invention.

FIG. 2 shows in block diagram a general configuration of the control device according to the present invention. The control device 100 can accept, e.g., the longitudinal acceleration, wheel speed, yaw rate, lateral acceleration, and steer angle as input signals; can generate output signals; and can execute various controls, as shown in FIG. 2. The control device 100 is provided with drive force control means 300, and the drive force control means 300 (also referred to as drive force control means) controls the drive force of the main drive wheels (e.g., the front wheel drive force) and the drive force of the auxiliary drive wheels (e.g., rear wheel drive force), as an example of the various controls.

In the example of FIG. 2, the control device 100 is provided with vehicle behavior control means 200. As examples of the various controls, the vehicle behavior control means 200 (also referred to as a vehicle behavior control device) is capable of obtaining the speed of the vehicle 1 (and the corrected speed of the vehicle 1) using the drive force-limiting unit 260 (also referred to as a drive force-limiting device), and the behavior control unit 270 is capable of controlling the behavior of the vehicle 1 on the basis of the speed of the vehicle 1 (and the corrected speed of the vehicle 1). The vehicle behavior control means 200 (also referred to as the drive force-limiting unit 260 and behavior control unit 270) is furthermore capable of requesting from the drive force control means 300 the auxiliary-drive-wheels-limiting drive force (limiting drive force) for limiting the drive force of the auxiliary drive wheels.

Specifically, the drive force control means 300 determines the ratio between the main drive wheel drive force (target value) and the auxiliary drive wheel drive force (target value), for example, and determines, e.g., the auxiliary drive wheel drive force (target value) on the basis of the ratio and the all-wheel drive force (target value). The drive force control means 300 controls, e.g., the distribution ratio of the rear differential gear mechanism 61 of FIG. 1 using output signals so that the determined auxiliary drive wheel drive force (target value) is obtained. The output signal from the drive force control means 300 to the rear differential gear mechanism 61 is a control signal for controlling the auxiliary drive wheel drive force (target value).

When the auxiliary drive wheel drive force is zero due to the distribution ratio of the rear differential gear mechanism 61, in other words, when the propeller shaft 55 and the rear drive shafts 64, 65 are cut off from each other, the main drive wheel drive force (target value) or the front-wheel drive force matches the all-wheel drive force (target value) in the example of FIG. 1. Alternatively, when the auxiliary drive wheel drive force is not zero due to the distribution ratio of the rear differential gear mechanism 61, in other words, when the propeller shaft 55 and the rear drive shafts 64, 65 are connected, the main drive wheel drive force (target value) matches the value obtained by subtracting the auxiliary drive wheel drive force (target value) from the all-wheel drive force (target value) in the example of FIG. 1.

In the example of FIG. 2, the control device 100 is provided with a drive force-limiting unit 260. The drive force-limiting unit 260 is capable of judging whether the rotational speed (wheel speed) of the auxiliary drive wheels (e.g., rear wheels 73, 74) of, e.g., FIG. 1 is less than a threshold value in the interval in which the drive force-limiting unit 260 requests an auxiliary-drive-wheel-limiting drive force (limiting drive force) from the drive force control means 300. The drive force-limiting unit 260 can reduce the speed of the vehicle 1 and obtained an estimated speed of the vehicle 1 at a timing in which the rotational speed (wheel speed) of the auxiliary drive wheels (e.g., rear wheels 73, 74) of, e.g., FIG. 1 is less than a threshold value. The estimated speed is thereby brought closer to the true speed and the precision of the estimated speed is improved. In the case that the wheel speed of the auxiliary drive wheels is not less than a threshold value, the drive force-limiting unit 260 can obtain the speed of the vehicle 1 directly as the estimated speed of the vehicle 1 without reducing the speed of the vehicle 1. For example, the input signal from the wheel speed sensors 83, 84 to the drive force-limiting unit 260 represents the rotational speed (wheel speed) of, e.g., the rear wheels 73, 74.

In the case that the drive force-limiting unit 260 makes a request for auxiliary-drive-wheels-limiting drive force (limiting drive force) to the drive force control means 300, the drive force control means 300 reduces the auxiliary drive wheel drive force (target value) and the drive force control means 300 increases the main drive wheel drive force (target value). At this time, the drive force control means 300 matches the auxiliary drive wheel drive force (target value) to the auxiliary-drive-wheels-limiting drive force (limiting drive force) to reduce the auxiliary drive wheel drive force (target value). Specifically, the drive force control means 300 controls the rear differential gear mechanism 61 so that the auxiliary drive wheel drive force is reduced by the distribution ratio of the rear differential gear mechanism 61. When the propeller shaft 55 and the rear drive shafts 64, 65 are more weakly connected, the actual auxiliary drive wheel drive force is reduced, and as a result, the actual main drive wheel drive force is increased. It is possible that the auxiliary drive wheels are slipping when the rotational speed (wheel speed) of the auxiliary drive wheels (e.g., front wheels 71, 72) is less than the threshold value due to a reduction in the drive force of the auxiliary drive wheels. Therefore, the drive force-limiting unit 260 can reduce the speed of the vehicle 1 under the assumption that the speed of the vehicle 1 is being calculated to be greater than the true speed. The speed (estimated speed) of the vehicle 1 is thereby brought closer to the true speed and the precision of the estimated speed is improved.

The drive force control means 300 is capable of determining in advance the main drive wheel drive force (target value) and the auxiliary drive wheel drive force (target value), reducing the auxiliary drive wheel drive force (target value) determined in advance in accordance with a request from the drive force-limiting unit 260, and increasing the main drive wheel drive force (target value) determined in advance.

The behavior control unit 270 is capable of requesting from the drive force control means 300 the auxiliary-drive-wheels-limiting drive force for limiting, e.g., the drive force of the auxiliary drive wheels. The drive force control means 300 primarily determines the main drive wheel drive force (target value) and the auxiliary drive wheel drive force (target value). The drive force control means 300 may determine whether to respond to the request for limiting the auxiliary drive wheel drive force (target value) from the drive force-limiting unit 260 or the behavior control unit 270, and may reject the request for limitation. In the case that the drive force-limiting unit 260 or the behavior control unit 270 requests the auxiliary-drive-wheels-limiting drive force (limiting drive force) from the drive force control means 300, the drive force control means 300 can secondarily (ultimately) determine the main drive wheel drive force (target value) and the auxiliary drive wheel drive force (target value).

3. Vehicle Behavior Control Means

Second Control Means

FIG. 2 also shows a schematic structural diagram of the vehicle behavior control means according to the present invention. The vehicle behavior control means 200 is provided with a drive force-limiting unit 260 having an estimation unit 250 for estimating the speed of the vehicle 1 and obtaining an estimated speed, and the behavior control unit 270 uses the estimated speed of the vehicle 1. In the example of FIG. 2, the drive force-limiting unit 260 is provided with not only the estimation unit 250, but also a correction unit 210, a first calculation unit 220, a second calculation unit 230, and an output unit 240.

3.1. Corrected Acceleration

Second Acceleration

For example, as shown in FIG. 2, the vehicle behavior control means 200 or the drive force-limiting unit 260 may be provided with an acceleration correction unit 210 for correcting a first acceleration of the vehicle 1 and obtaining a corrected first acceleration as a second acceleration. The first acceleration is acceleration (longitudinal acceleration) detected by the first longitudinal acceleration sensor 85 of, e.g., FIG. 1. The acceleration correction unit 210 is capable of correcting the first acceleration of the vehicle with consideration given to detection error of the longitudinal acceleration sensor 85, installation error of the longitudinal acceleration sensor 85, and other errors. The acceleration correction unit 210 can obtain a second acceleration by adding, e.g., an offset value or a fixed value to the first acceleration. The offset value or the fixed value can be set to a maximum error that may be included in the first acceleration. The offset value or the maximum error may be suitably set in accordance with the attributes of the longitudinal acceleration sensor 85.

Figure 3:
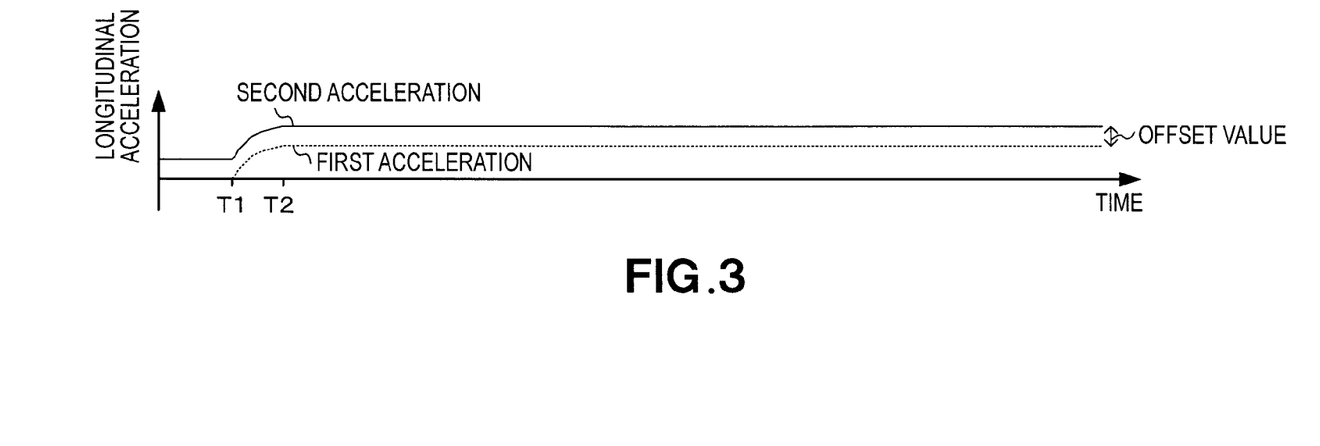
FIG. 3 is a graph explanatory of a first acceleration and a second acceleration.

FIG. 3 represents a schematic structural diagram of the first acceleration and the second acceleration. In the example of FIG. 3, the solid line shows the second acceleration, and the dotted line shows the first acceleration (longitudinal acceleration detected by the longitudinal acceleration sensor 85). In the example of FIG. 3, the vehicle 1 is initially stopped, and the vehicle 1 thereafter begins to move at first time T1. The first acceleration increases from zero to a predetermined acceleration in accompaniment with the start of movement. When the predetermined acceleration is reached at a second time T2, the first acceleration thereafter exhibits a fixed acceleration. The acceleration correction unit 210 of FIG. 2 calculates a value obtained by adding an offset value to the first acceleration, and the value is obtained as a second acceleration. The acceleration correction unit 210 can correct the first acceleration, as shown in FIG. 3, for example.

3.2. First Speed

In the example of FIG. 2, the first calculation unit 220 calculates a first speed of the vehicle on the basis of the wheel speed of the drive wheels and the first acceleration. The wheel speed of the drive wheels is the wheel speed of, e.g., the auxiliary drive wheels, and is specifically the average of the two rotational speeds (wheel speeds) detected by the wheel speed sensors 83, 84 of, e.g., FIG. 1. The first acceleration is acceleration (longitudinal acceleration) detected by the first longitudinal acceleration sensor 85 of, e.g., FIG. 1. The first calculation unit 220 calculates the average of the two rotational speeds (wheel speeds) detected by, e.g., wheel speed sensors 83, 84 and may obtain or estimate the speed Vvh_es1 of the vehicle 1.

Nevertheless, the speed (first estimated speed) of the vehicle 1 preferably uses a falling limit and rising limit based on the first acceleration as the wheel speeds of the rear wheels 73, 74 (auxiliary drive wheels) in order to eliminate the effect of noise by, e.g., vibrations or the like of the vehicle 1. The falling limit and the rising limit are limit values that can be arrived at by converting the first acceleration to a speed value. The minimum between the limit value (i.e. speed value) and the difference between current and previous wheel speeds, is added to the previous wheel speed in order to arrive at the first estimated speed of the vehicle. The limit value thereby limits the speed value that is added to the previous wheel speed to arrive at the first estimated speed. Conversion of the first acceleration to limit values occurs at rising limit means C555, and C575. In other words, the first calculation unit 220 is capable of using the first acceleration to correct or adjust the two rotational speeds (wheel speeds) detected by the wheel speed sensors 83, 84, calculating the average of the two rotational speeds (wheel speeds) thus corrected or adjusted, and obtaining or estimating the first speed of the vehicle 1. The first speed (first estimated speed) of the vehicle 1 may be estimated using another method.

In the example of FIG. 2, the second calculation unit 230 calculates a second speed of the vehicle on the basis of the wheel speed of the drive wheels and the second acceleration. The wheel speed of the drive wheels is, e.g., the wheel speed of the auxiliary wheels. The second acceleration is acceleration (corrected longitudinal acceleration) calculated by the acceleration correction unit 210 of, e.g., FIG. 2. The second calculation unit 230 is capable of using the second acceleration to correct or adjust the two rotational speeds (wheel speeds) detected by, e.g., the wheel speed sensors 83, 84, calculating the average of the two rotational speeds (wheel speeds) thus corrected or adjusted, and obtaining or estimating a second speed Vvh_es2 of the vehicle 1. The second speed Vvh_es2 (second estimated speed) of the vehicle 1 may be calculated in the same manner as the first speed Vvh_es1.

Figure 4:
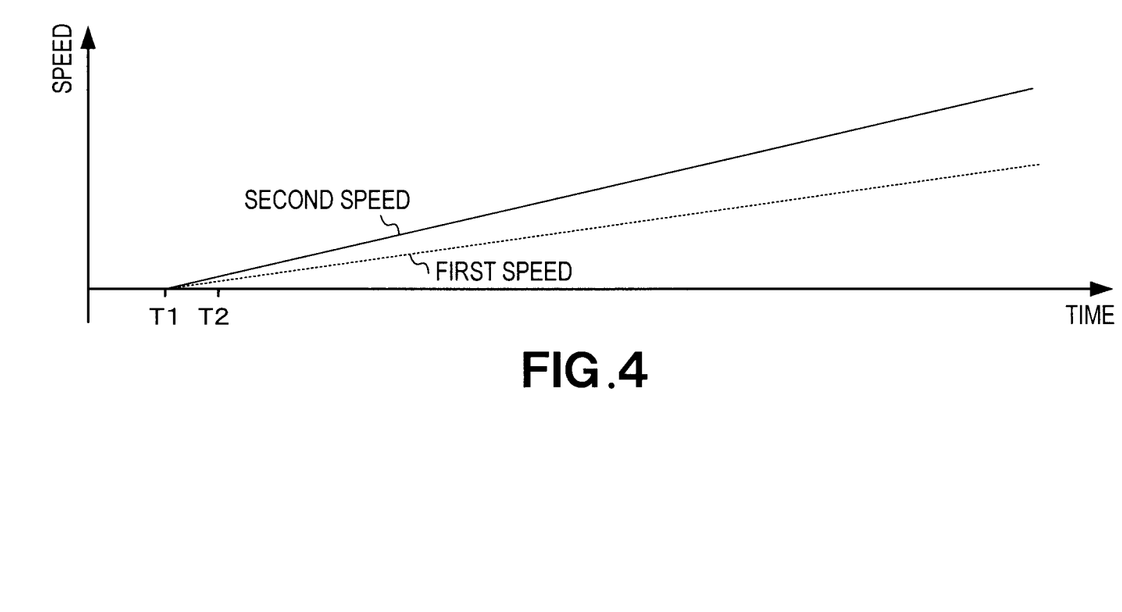
FIG. 4 is a graph showing a first speed and a second speed.

FIG. 4 represents a schematic structural diagram of the first speed and the second speed. In the example of FIG. 4, the solid line shows the second speed, and the dotted line shows the first speed. The second speed is calculated using the second calculation unit 230 on the basis of second acceleration (corrected longitudinal acceleration) shown in FIG. 3, and the first acceleration is calculated using the first calculation unit 220 on the basis of the first acceleration (uncorrected longitudinal acceleration) shown in FIG. 3. In the example of FIG. 4, the vehicle 1 is initially stopped, and the vehicle 1 thereafter begins to move at first time T1. The first and second speeds increase from time T1 in accordance with the start of movement.

3.4. Limiting Drive Force

In the example of FIG. 2, the output unit 240 (request unit) judges whether the difference between the first speed and the second speed is at a first threshold value or greater. Specifically, the output unit 240 judges whether the value obtained by subtracting the first speed from the second speed is at a first threshold value or greater. In the case that the difference between the first speed and the second speed is at a first threshold value or greater, the output unit 240 outputs to the drive force control means 300 of, e.g., FIG. 2 a limiting drive force for limiting the drive force (e.g., an auxiliary-drive-wheel-limiting drive force for limiting the drive force of the auxiliary drive wheels). The output unit 240 (request unit) thus requests a limitation of the drive force from, e.g., the drive force control means 300.

FIGS. 5(A) and 5(B) represent a schematic structural diagrams of the auxiliary-drive-wheel-limiting drive force. FIG. 5(A) shows the timing for generating a request for the auxiliary-drive-wheel-limiting drive force; and FIG. 5(B) shows the auxiliary-drive-wheel-limiting drive force outputted from the drive force-limiting unit 260 or the output unit 240.

FIG. 5(A) shows the difference between the first speed and the second speed shown in FIG. 4; and the difference between the first and second speeds at time T3 matches a first threshold value. The difference between the first and second speeds thereafter exceeds the first threshold value.

In FIG. 5(B), the solid line shows output from the drive force-limiting unit 260. Until time T3, the output from the drive force-limiting unit 260 represents a value that does not limit the drive force of the auxiliary drive wheels, and at time T3, the output represents the value for limiting the drive force of the auxiliary drive wheels (the auxiliary-drive-wheel-limiting drive force for limiting the drive force of the auxiliary drive wheels). The output from the drive force-limiting unit 260 can be kept at a fixed value between time T3 and time T5. The time T5 (a predetermined time) can be set to a time at which a predetermined interval has elapsed from time T3, and the predetermined interval can be suitably set in accordance with the attributes of the vehicle 1.

The auxiliary-drive-wheel-limiting drive force (fixed value) from time T3 to time T5 can be set to a drive force that does not affect the first acceleration (uncorrected longitudinal acceleration) shown in, e.g., FIG. 3. Specifically, the auxiliary-drive-wheel-limiting drive force (fixed value) is preferably set to a drive force that can maintain the first acceleration in a state in which the auxiliary drive wheels do not slip. The vehicle 1 can be restrained from accelerating with unnecessarily high energy by preparing such a auxiliary-drive-wheel-limiting drive force (fixed value) in advance. The auxiliary-drive-wheel-limiting drive force (fixed value) can be set to a high level in proportion to the magnitude of the first acceleration. The auxiliary-drive-wheel-limiting drive force (fixed value) can be suitably set in accordance with the attributes of the vehicle 1.

At time T5, the output from the drive force-limiting unit 260 may be restored to a value that does not limit the drive force of the auxiliary drive wheels. However, at time T7 in FIG. 5(B), the output from the drive force-limiting unit 260 is restored to a value that does not limit the drive force of the auxiliary drive wheels. The output (a value that limits the drive force of the auxiliary drive wheels) from the drive force-limiting unit 260 can be gradually increased between time T5 and time T7. The drive force-limiting unit 260 or the output unit 240 can thus request a limitation of the drive force of the auxiliary drive wheels between time T3 to time T7. A value that does not limit the auxiliary drive wheel drive force is the maximum value of the auxiliary drive wheel drive force that can be determined by, e.g., the drive force control means 300 of FIG. 2. The output unit 240 can send to the estimation unit 250 of FIG. 2 a signal (e.g., a signal expressing a binary "1" or high level) expressing a request for auxiliary-drive-wheel-limiting drive force from time T3 to time T7 of, e.g., FIG. 5.

In FIG. 5(B), the dotted line shows the drive force (target value) of the auxiliary drive wheels secondarily (ultimately) determined by the drive force control means 300. The drive force (target value) of the auxiliary drive wheels primarily determined by the drive force control means 300 is used unchanged until time T3. At time T3, the drive force control means 300 receives the request to limit the drive force of the auxiliary drive wheels from the drive force-limiting unit 260, and the drive force of the auxiliary drive wheels secondarily determined by the drive force control means 300 matches the auxiliary-drive-wheel-limiting drive force from the drive force-limiting unit 260. Thereafter and until time T6, the drive force control means 300 receives requests to limit the drive force of the auxiliary drive wheels from the drive force-limiting unit 260. In the example of FIG. 5(B), the solid line that corresponds from time T3 to time T6 is drawn as a bold line and is a solid line in which the output (solid line) from the output unit 260 matches the drive force of the auxiliary drive wheels (dotted line) ultimately determined by the drive force control means 300. At time T6, the drive force control means 300 rejects the request to limit the drive force of the auxiliary drive wheels from the drive force-limiting unit 260, and after time T6, the drive force of the auxiliary drive wheels secondarily determined by the drive force control means 300 does not match the drive force of the auxiliary drive wheels primarily determined by the drive force-limiting unit 300.

3.5. Estimated Speed of the Vehicle

In the example of FIG. 2, the estimation unit 250 estimates the speed of the vehicle 1. Ordinarily, the estimation unit 250 uses the second speed (second estimated speed) such as that shown in FIG. 4 as the estimated speed of the vehicle 1. However, the second speed can be calculated to be higher than the true speed. In other words, in the case that the auxiliary drive wheels (e.g., rear wheels 73, 74) are slipping, the wheel speed of the auxiliary drive wheels is greater than the true speed, and the second speed based on the wheel speed of the auxiliary drive wheels is therefore also greater than the true speed. The wheel speed of the slipping auxiliary drive wheels is reduced while the drive force-limiting unit 260 requests a limitation of the drive force (e.g., after time T3 of FIG. 5). The drive force-limiting unit 260 or the estimation unit 250 reduces the second speed in accordance with the reduction of the wheel speed of the auxiliary drive wheels, and the estimated speed of the vehicle 1 can be obtained. An example of calculating the estimated speed of the vehicle 1 will be described next.

3.5.1. Example (Graph) of Calculating the Estimated Speed of the Vehicle

Figure 6:
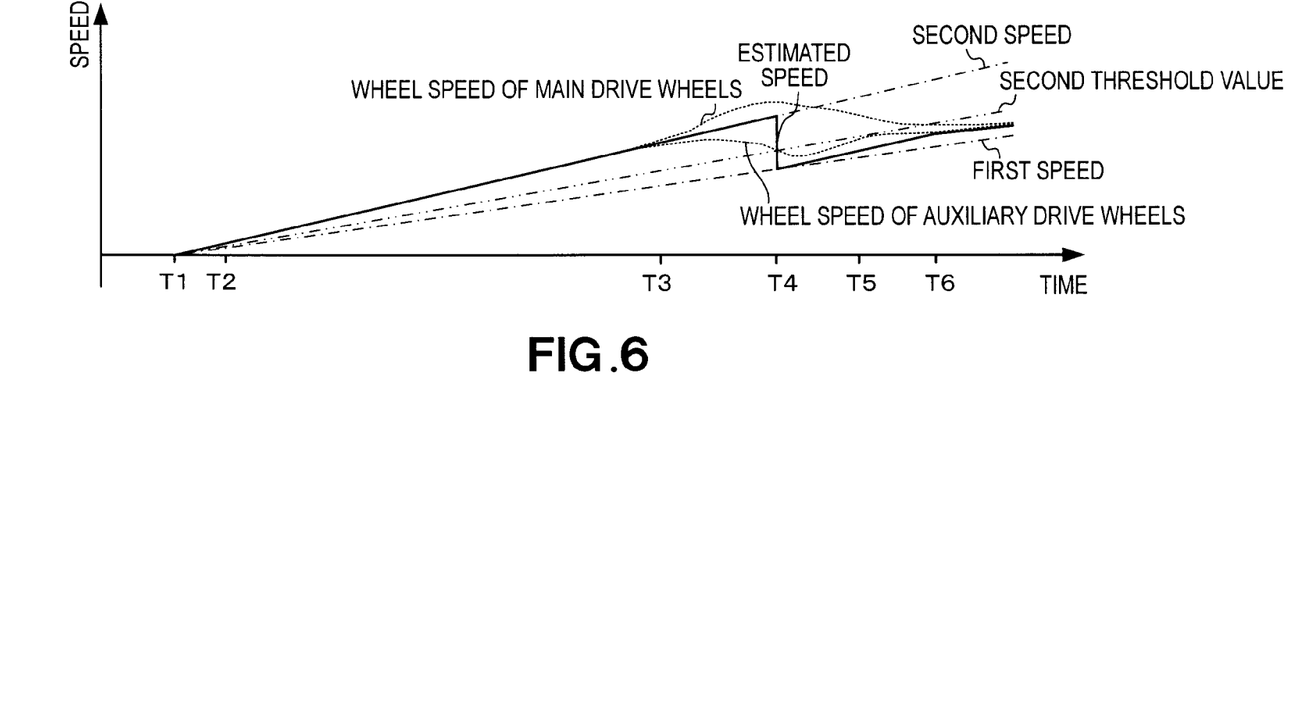
FIG. 6 is a graphical representation of a calculational example of an estimated speed of the vehicle 1.

FIG. 6 represents a calculational example of the estimated speed of the vehicle 1. In the example of FIG. 6, the solid line represents the estimated speed of the vehicle 1 obtained by the estimation unit 250. The estimation unit 250 uses the second speed shown in FIGS. 4 and 6 as the estimated speed of the vehicle 1 up to time T4. At time T4, the estimation unit 250 resets the second speed by using the first speed and obtains the estimated speed of the vehicle 1.

As described above, the output unit 240 can request from, e.g., the drive force control means 300 a limitation of the drive force of the auxiliary drive wheels from time T3 in the case that the difference between the first and second speeds is at a first threshold value or higher. In accordance with the request, the drive force control means 300 can reduce the drive force of the auxiliary drive wheels and increase the drive force of the main drive wheels. In the example of FIG. 6, the two dotted lines represent the wheel speed of the main drive wheels and the auxiliary drive wheels, and the wheel speed of the main drive wheels and the auxiliary drive wheels substantially matches the second speed until time T3. The wheel speed of the auxiliary drive wheels is reduced from time T3 and the wheel speed of the main drive wheels conversely increases. The estimation unit 250 judges whether the wheel speed of the auxiliary drive wheels is less than the second threshold value. Specifically, the estimation unit 250 judges whether the average of two rotational speeds (wheel speeds) detected by, e.g., wheel speed sensors 83, 84 of, e.g., FIG. 1 is less than the second threshold value.

In the example of FIG. 6, the wheel speed of the auxiliary drive wheels is less than the second threshold value at time T4. The second threshold value is based on at least one of the first speed and the second speed, and is specifically based on a proportion of the difference between the first speed and the second speed. In the example of FIG. 6, the two single-dot single-dash lines show the first and second speeds, and the two-dot single dash line shows the second threshold value. The second threshold value is an index for verifying whether the auxiliary drive wheels are slipping. At time T4, the estimation unit 250 uses as the estimated speed of the vehicle 1 the value obtained by subtracting the difference between the first and second speeds from the second speed (equaling the first speed at time T4). The estimation unit 250 is thus capable of resetting the second speed by using the first speed at time T4 and bringing the estimated speed of the vehicle 1 close to the true speed. At this time, the estimation unit 250 can store or hold the difference between the first and second speeds at time T4. After time T4, the estimation unit 250 uses as the estimated speed of the vehicle 1 the value obtained by subtracting the difference (stored or held difference) between the first and second speeds at time T4 from the second speed calculated by the second calculation unit 230.

In a different example (not shown) from the example of FIG. 6, the estimation unit 250 can continue to use the second speed calculated by the second calculation unit 230 as the estimated speed of the vehicle 1 in the case that the wheel speed of the auxiliary drive wheels is less than the second threshold value in the interval time T3 to time T5. In such a case, the estimation unit 250 is not required to reset the second speed by using the first speed.

3.5.2 Method of Calculating Estimated Speed of Vehicle (Function Clock)

Figure 7:
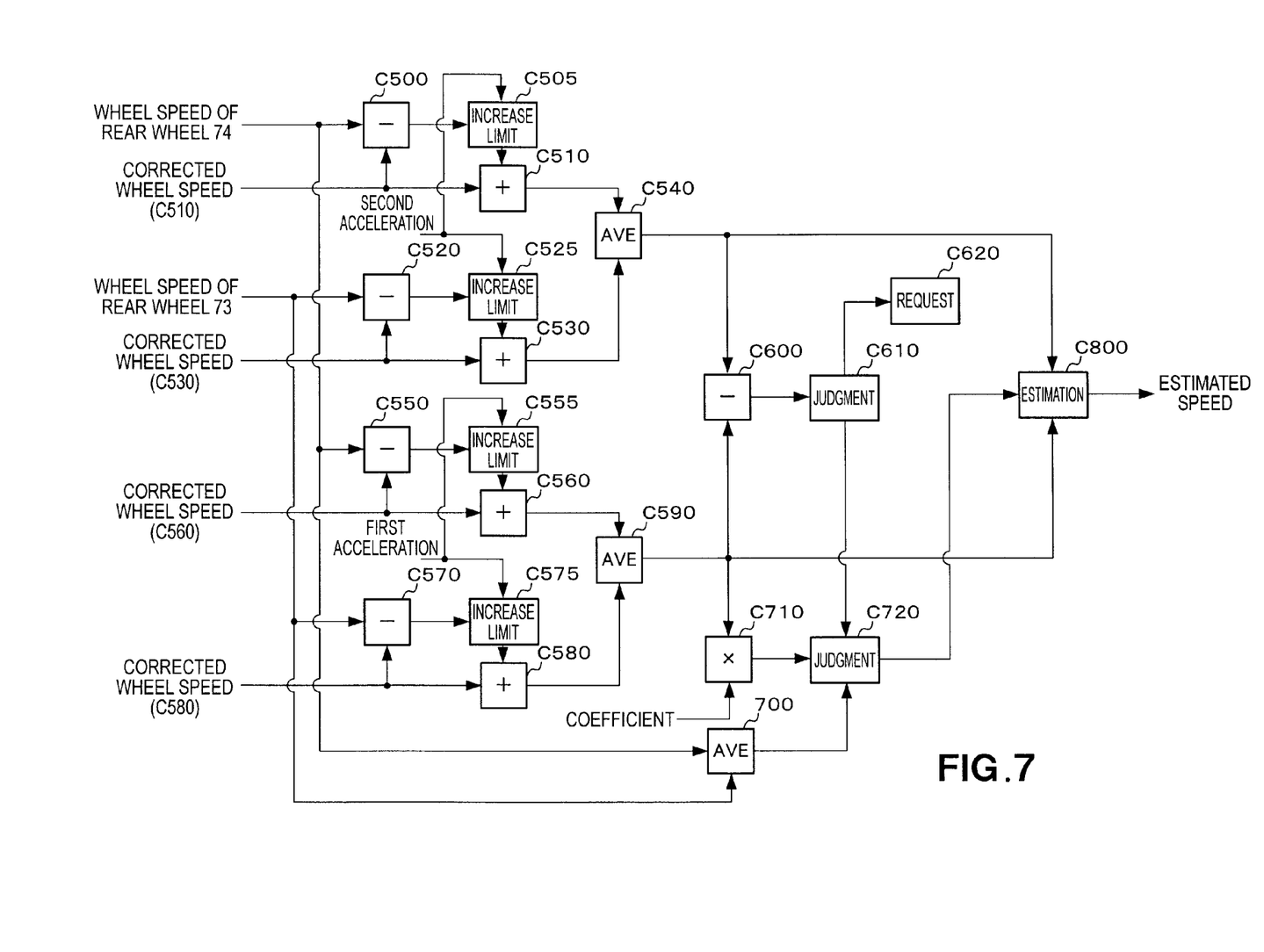
FIG. 7 a logic diagram showing a calculation method of the estimated speed of the vehicle 1.

FIG. 7 represents a method of calculating the estimated speed of the vehicle 1 estimated by the estimation unit 250. In the example of FIG. 7, first, the wheel speed of the rear wheel 74 is a (current) value measured by the wheel speed sensor 84, the corrected wheel speed (C510) is the wheel speed (previous) of the rear wheel 74 in which the value (previous) measured by the wheel speed sensor 84 has been corrected using the second acceleration. Subtraction means C500 subtracts the corrected wheel speed (previous) from the (current) wheel speed of the rear wheel 74. Rising limit means C505 outputs the minimum value among the subtraction result (speed) and the second acceleration so that the subtraction result (speed) is equal to or less than the second acceleration. Addition means C510 adds the minimum value and the wheel speed (previous) of the rear wheel 74, and the addition result represents the wheel speed (current) of the rear wheel 74 corrected using the second acceleration.

The wheel speed (the (current) value measured by the wheel speed sensor 83) of the rear wheel 73 is corrected in the same manner as the wheel speed (the (current) value measured by the wheel speed sensor 84) of the rear wheel 74 by way of subtraction means C520, rising limit means C525, and addition means C530. In other words, the addition result of the addition means C530 expresses the (current) wheel speed of the rear wheel 73 corrected using the second acceleration. Averaging means C540 averages the addition result of the addition means C510 and the addition results of the addition means C530, and obtains the wheel speed of the rear wheels 73, 74. The output of the averaging means C540 represents the second speed, which is the output of the second calculation unit 230 of, e.g., FIG. 2.

The wheel speed (the (current) value measured by the wheel speed sensor 84) of the rear wheel 74 is corrected by way of subtraction means C550, rising limit means C555, and addition means C560. In other words, the addition result of the addition means C560 expresses the (current) wheel speed of the rear wheel 74 corrected using the first acceleration. The wheel speed (the (current) value measured by the wheel speed sensor 83) of the rear wheel 73 is corrected by way of subtraction means C570, rising limit means C575, and addition means C580. In other words, the addition result of the addition means C580 represents the (current) wheel speed of the rear wheel 73 corrected by the first acceleration. Averaging means C590 averages the addition result of the addition means C560 and the addition means of the addition means C580, and obtains the wheel speed of the rear wheels 73, 74. The output of the averaging means C590 represents the first speed, which is the output of the first calculation unit 220 of, e.g., FIG. 2.

Subtraction means C600 subtracts the output (first speed) of the averaging means C590 from the output (second speed) of the averaging means C540. Judgment means C610 judges whether the output of the subtraction means C600 is at a first threshold value or greater. Request means C620 requests from the drive force control means 300 of, e.g., FIG. 2 the limit of the drive force of the auxiliary drive wheels in the case that the judgment result of the judgment means C610 is affirmative, i.e., in the case that the difference between the second speed and the first speed is at a first threshold value or greater. The output of the request means C620 represents the output of the output unit 240 of, e.g., FIG. 2.

Multiplication means C710 multiplies a coefficient and the output (first speed) of the averaging means C590. The output of the multiplication means C710 represents the second threshold value such as shown in, e.g., FIG. 6. However, the output of the multiplication means C710 may be based only on the output (first speed) of the averaging means C590, and the coefficient may be set to be greater than 1. The second threshold value may also be calculated based on the proportion of the difference between the output (first speed) of the averaging means C590 and the output (second speed) of the averaging means C540. Averaging means 700 averages the (current) value measured by the wheel speed sensor 83 and the (current) value measured by the wheel speed sensor 84. Judgment means C720 judges whether the output (wheel speed of the auxiliary drive wheels) of the averaging means 700 is less than the output (second threshold value) of the multiplication means C710.

Estimation means C800 resets the output (second speed) of the averaging means C540 using the output (first speed) of the averaging means C590 in the case that the judgment result of the judgment means C720 is affirmative, i.e., in the case that the wheel speed of the auxiliary drive wheels is less than the second threshold value. The output (second speed) of the averaging means C540 is output unchanged in the case that the wheel speed of the auxiliary drive wheels is not less than the second threshold value in the interval from time T3 to time T5 of, e.g., FIG. 5. The output of the estimation means C800 represents the output (estimated speed of vehicle 1) of the estimation unit 250 of, e.g., FIG. 2.

The behavior control unit 270 of FIG. 2 or the vehicle 1 of FIG. 1 can be provided with at least one function from among a function for suppressing spinning of wheels (traction control system), a function for suppressing locking of wheels (antilock brake system), and a function for suppressing side-slipping of a vehicle. The estimated speed of the vehicle 1 can be used in such functions. Specifically, the detection unit 270 of FIG. 2 detects, e.g., the unstable state of the vehicle 1 and can request an auxiliary-drive-wheel-limiting drive force for the purpose of controlling the behavior of the vehicle 1. The behavior control unit 270 can judge whether the traveling state of the vehicle 1 is unstable by using, e.g., the actual yaw rate acquired from the yaw rate sensor 86 and the reference yaw rate calculated based on steer angle and the estimated speed of the vehicle 1. The precision for detecting, e.g., an unstable state of the vehicle 1 is improved when the precision of the estimated speed of the vehicle 1 is improved.

The behavior control unit 270 may calculate the amount of slipping of the main drive wheels (the front wheels 71, 72). The slip amount Smw of the main drive wheels is a value obtained by, e.g., subtracting the estimated speed of the vehicle 1 from the average wheel speed Vmw_av of the main drive wheels. The average wheel speed Vmw_av is the average of the two rotational speeds (wheel speeds) detected by the wheel speed sensors 81, 82. The slip amount Smw of the main drive wheels is reduced when the estimated speed of the vehicle 1 is greater than the true speed. In other words, the behavior control unit 270 of FIG. 2 has difficulty detecting slippage of the main drive wheels in the case that the estimated speed of the vehicle 1 is greater than the true speed. That is to say, the precision for detecting, e.g., slippage of the main drive wheels is improved when the precision of the estimated speed of the vehicle 1 is improved.

4. Motor-Limiting Force

Modified Example

In the example of FIG. 2, the output unit 240 requests a limitation of the drive force from, e.g., the drive force control means 300. Alternatively, the output unit 240 may request a limitation of the motor drive force from, e.g., the motor control means 20 of FIG. 1. In this case, the output unit 240 calculates the limiting drive force for limiting the motor drive force, and the motor control means 20 causes the motor drive force (target value) obtained in advance to match the limiting drive force. The limiting drive force for limiting the motor drive force may be set so that the first acceleration is unaffected. The limiting drive force for limiting the motor drive force is preferably set to a drive force that can maintain the first acceleration in a state in which the auxiliary drive wheels do not slip.

Figure 5:
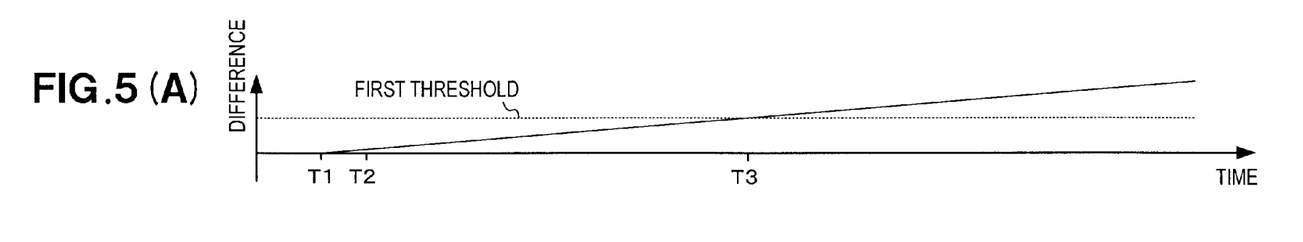
FIGS. 5(A) and 5(B) are graphical representations showing an auxiliary-drive-wheel-limiting drive force.
Figure 8:
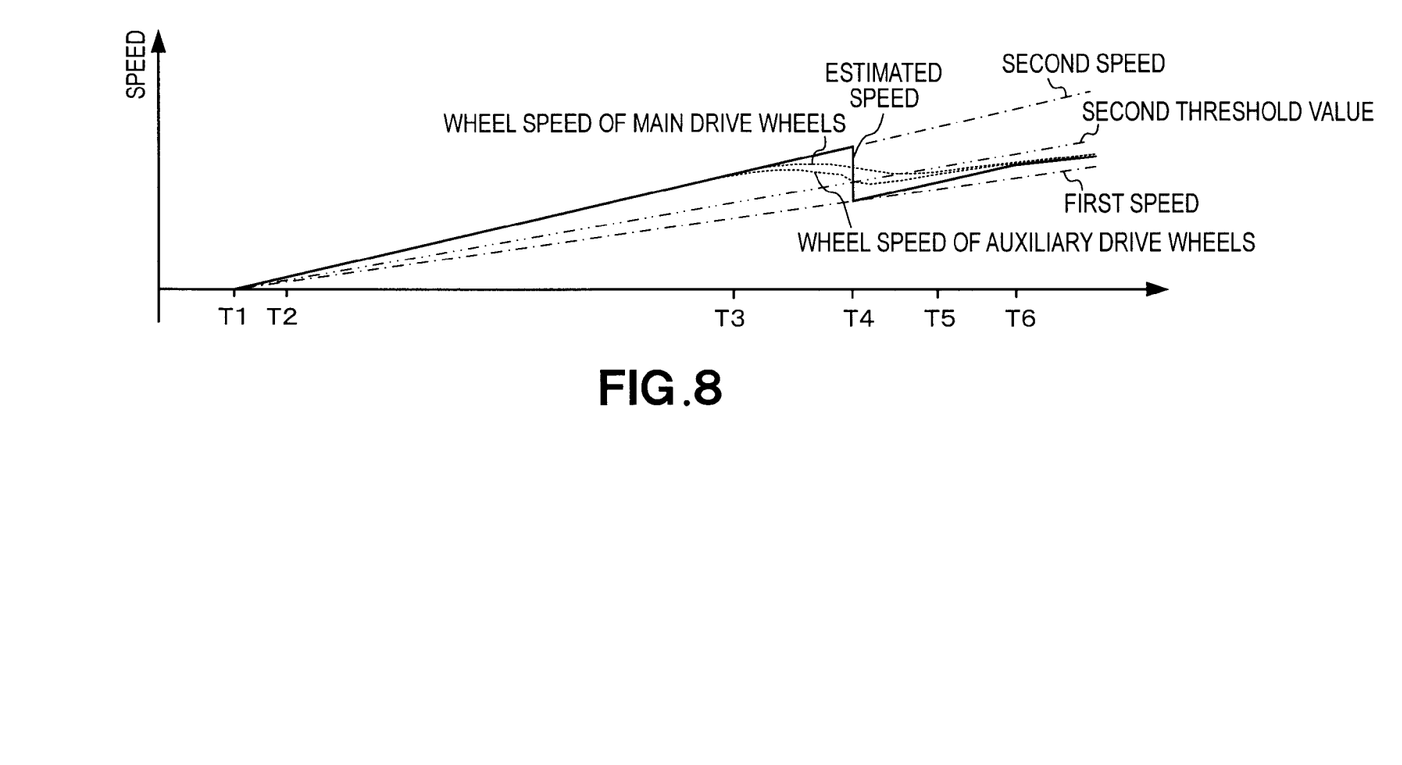
FIG. 8 is a graphical representation of another calculational example of the estimated speed of the vehicle 1.

FIG. 8 represents another calculational example of the estimated speed of the vehicle 1. The example of FIG. 8 is similar to that of FIG. 6. In the example of FIG. 5, the output from the output unit 240 represents the auxiliary-drive-wheel-limiting drive force (fixed value) in the interval of time T3 to time T5. Alternatively, in a modified example of the example of FIG. 5, the output from the output unit 240 may represent the limiting drive force (fixed value) for limiting the motor drive force in the interval of time T3 to time T5. In this case, the wheel speed of the auxiliary drive wheels is reduced from time T3 and the wheel speed of the main drive wheels is reduced (FIG. 8) due to the reduction in the motor drive force. In the example of FIG. 8, the estimation unit 250 or the drive force-limiting unit 260 judges whether the wheel speed of the auxiliary drive wheels is less than the second threshold value. In the example of FIG. 8, the estimation unit 250 uses, as the estimated speed of the vehicle 1, the value obtained by subtracting the difference between the first and second speeds at time T4 from the second speed.

Obviously, various minor changes and modifications of the present invention are possible in light of the above teaching. It is therefore to be understood that within the scope of the appended claims the invention may be practiced otherwise than as specifically described.

What is claimed is:
1. A drive force-limiting device for limiting a drive force that acts on a drive wheel of a vehicle, the drive force-limiting device comprising at least one processor, the at least one processor comprising:
an acceleration correction unit for correcting a first acceleration of the vehicle and obtaining a corrected first acceleration as a second acceleration;
a first calculation unit for calculating a first speed of the vehicle on the basis of a wheel speed of the drive wheel and the first acceleration;
a second calculation unit for calculating a second speed of the vehicle on the basis of the wheel speed and the second acceleration;
a request unit for requesting a limiting drive force for limiting the drive force in a case that a difference between the first speed and the second speed is equal to or greater than a first threshold value; and
an estimation unit in which the second speed is set as an estimated speed of the vehicle, wherein
the first speed is calculated by subtracting a previous wheel speed from a current wheel speed to arrive at a first subtraction result, converting the first acceleration into a first limit value, and adding a minimum of the first subtraction result and the first limit value to the previous wheel speed;
the second speed is calculated by subtracting the previous wheel speed from the current wheel speed to arrive at a second subtraction result, converting the second acceleration into a second limit value, and adding a minimum of the second subtraction result and the second limit value to the previous wheel speed; and the request unit requests the limiting drive force, whereby, when the wheel speed is less than a second threshold value, the estimation unit resets the second speed to equal the first speed and sets the estimated speed to the second speed.

2. The drive force-limiting device according to claim 1, wherein when the wheel speed is less than the second threshold value and after resetting the second speed to equal the first speed, the estimation unit adjusts the estimated speed to equal a value obtained by subtracting, from the second speed calculated by the second calculation unit, the difference between the second speed and the first speed.

3. The drive force-limiting device according to claim 1, wherein the limiting drive force is a drive force that does not affect the first acceleration.

4. The drive force-limiting device according to claim 1, wherein the limiting drive force is a drive force that can keep the first acceleration in a state in which the drive wheel does not slip.

5. The drive force-limiting device according to claim 1, wherein the estimation unit continues to set the second speed as the estimated speed in a case that the wheel speed is not less than the second threshold, even when a predetermined time has elapsed from the time at which the request unit requested the limiting drive force.

6. The drive force-limiting device according to claim 1, wherein
the request unit sends the limiting drive force to a drive force control device for controlling a front wheel drive force and a rear wheel drive force of the vehicle;
the drive wheel is an auxiliary drive wheel;
the drive force is an auxiliary drive wheel drive force that acts on the auxiliary drive wheel;
the limiting drive force limits the drive force of the auxiliary drive wheel; and
the auxiliary drive wheel drive force is one of the drive force of the front wheel or the drive force of the rear wheel.

7. The drive force-limiting device according to claim 1, wherein
the request unit sends the limiting drive force to motor control device for controlling a motor of the vehicle; and
the limiting drive force limits motor drive force.

8. The drive force-limiting device according to claim 1, wherein the second threshold value is based on at least one of the first speed and the second speed.

9. The drive force-limiting device according to claim 1, wherein the second threshold value is based on a ratio with respect to the difference between the first speed and the second speed.

10. A control device comprising:
the drive force-limiting device of claim 1; and
a drive force control device for controlling the drive force, wherein
the request unit sends the limiting drive force to the drive force control device.

11. A vehicle behavior control device provided with the drive force-limiting device of claim 1.

* * * * *